United States Patent Office 3,360,561
Patented Dec. 26, 1967

3,360,561
NITRATION OF TETRACYCLINES
Ronald Theodore Zambrano, Paterson, N.J., assignor to American Cyanamid Company, Stamford, Conn., a corporation of Maine.
No Drawing. Filed June 19, 1967, Ser. No. 647,186
10 Claims. (Cl. 260—559)

ABSTRACT OF THE DISCLOSURE

This disclosure describes a process for the nitration of tetracyclines employing potassium nitrate in a trifluoroacetic acid medium.

BRIEF SUMMARY OF THE INVENTION

This invention relates to a novel nitration process for preparing compounds having the following general formula:

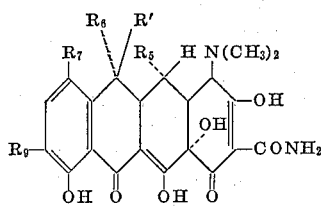

(I)

wherein $R_5$ is hydrogen or hydroxy, $R'$ is hydrogen or hydroxy, $R_6$ is hydrogen or methyl, $R'$ and $R_6$ taken together is methylene, $R_7$ is hydrogen, chloro or nitro and $R_9$ is hydrogen or nitro with the proviso that $R_7$ and $R_9$ cannot both be hydrogen. More particularly, the present invention comprises nitrating a compound of the general formula:

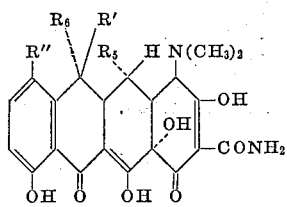

(II)

wherein $R_5$, $R'$ and $R_6$ are as hereinabove defined and $R''$ is hydrogen or chloro, with potassium nitrate in trifluoroacetic acid as solvent.

DETAILED DESCRIPTION OF THE INVENTION

Specific starting materials operable in this nitration process include tetracycline, 5-hydroxytetracycline, 6-demethytetracycline, 6-deoxytetracycline, 6-demethyl-6-deoxytetracycline, 6-demethyl-5-hydroxytetracycline, 6-deoxy-5-hydroxytetracycline, 6-demethyl-6-deoxy-5-hydroxytetracycline, 7-chlorotetracycline, 7-chloro-6-demethyltetracycline, and 5-hydroxy-6-demethyl-6-deoxy-6-methylenetetracycline.

As will be apparent from the examples which follow, the nitration of the tetracycline starting materials (when $R''$ is hydrogen) results in two mononitro isomers with the nitro group attached to the aromatic ring of the tetracycline nucleus in the ortho-position to the hydroxyl group in one compound and in the para-position to the hydroxyl group in the other compound, or in other words, in one isomer the nitro group is in the 7-position of the aromatic ring whereas in the other isomer it is in the 9-position. These mononitro isomers may be readily separated by standard methods such as fractional crystallization or paper strip chromatography. If a mononitro derivative is desired, then one molar equivalent of potassium nitrate is employed, whereas if the 7,9-dinitro derivative is desired, then two molar equivalents of potassium nitrate are employed. The solvent of choice in the novel process of the present invention is trifluoroacetic acid. It is advantageous to employ just sufficient trifluoroacetic acid to dissolve the tetracycline starting material. Potassium nitrate is then dissolved in a separate portion of trifluoroacetic acid. This potassium nitrate-trifluoroacetic acid solution is then added dropwise to the trifluoroacetic acid solution of the tetracycline starting material in such a proportion that one molar equivalent of potassium nitrate is added to one molar equivalent of the tetracycline starting material when a mononitro derivative is desired. If a 7,9-dinitro derivative is desired, then the potassium nitrate-trifluoroacetic acid solution is added dropwise to the trifluoroacetic acid solution of the tetracycline starting material in such a proportion that two molar equivalents of potassium nitrate are added to one molar equivalent of the tetracycline starting material. In all cases, best results are obtained when the volume:volume ratio of the potassium nitrate-trifluoroacetic acid solution and the trifluoroacetic acid solution of the tetracycline starting material is about 1:5.

Temperature is not a critical factor. Temperatures of from about 0° C. to about 35° C. can be employed. A temperature of from about 0° C. to about 5° C. is, however, preferred since it produced the desired products in higher yield. Somewhat higher temperatures, while operative, tend to result in diminished yields. The time of reaction is likewise not a critical factor. The time necessary to obtain substantially complete reaction varies, of course, with the reaction temperature and the reactivity of the particular tetracycline starting material employed. In the preferred temperature range of from about 0° C. to about 5° C., a reaction period of from about 2 hours to about 4 hours results in substantial nitration of the tetracycline starting material.

The products are recovered from the reaction mixture by conventional methods. For example, the product may be isolated by precipitation with a solvent such as diethyl ether or hexane or by concentration, usually under reduced pressure, or by a combination of these. Work-up of the reaction mixture to obtain the desired nitro products may also be accomplished by known procedures such as precipitation, concentration, solvent extraction, or a combination of these procedures. After isolation, the products may be purified by any of the generally known methods for purification of tetracycline compounds. These include recrystallization from various solvents and mixed solvent systems, chromatographic techniques, and counter current distribution, all of which are usefully employed for this purpose.

The tetracycline starting materials may be employed in the novel nitration process of the present invention either in the form of their free bases or in the form of their salts with various organic and inorganic acids, depending upon the solubility characteristics desired.

The 7- and/or 9-nitrotetracyclines prepared by the novel nitration process of the present invention are useful as intermediates in the preparation of the biologically active substituted 7- and/or 9-aminotetracyclines as is more fully set forth in U.S. Patent No. 3,148,212 to Boothe et al.

Typical compounds which may be prepared by the novel nitration process of the present invention include, for example, 5-hydroxy-7-nitrotetracycline,
5-hydroxy-9-nitrotetracycline,
6-demethyl-7-nitrotetracycline,
6-demethyl-9-nitrotetracycline,
6-deoxy-7-nitrotetracycline,
6-deoxy-9-nitrotetracycline,
6-demethyl-6-deoxy-7-nitrotetracycline,
6-demethyl-6-deoxy-9-nitrotetracycline,
6-demethyl-5-hydroxy-7-nitrotetracycline,
6-demethyl-5-hydroxy-9-nitrotetracycline,
7-nitrotetracycline,
9-nitrotetracycline,
7-chloro-9-nitrotetracycline,
7-chloro-6-demethyl-9-nitrotetracycline,
5-hydroxy-6-demethyl-6-deoxy-6-methylene-7-nitrotetracycline,
5-hydroxy-6-demethyl-6-deoxy-6-methylene-9-nitrotetracycline,
6-deoxy-5-hydroxy-7-nitrotetracycline,
6-deoxy-5-hydroxy-9-nitrotetracycline,
6-demethyl-6-deoxy-5-hydroxy-7-nitrotetracycline, and
6-demethyl-6-deoxy-5-hydroxy-9-nitrotetracycline.

The novel nitration process of the present invention provides distinct advantages over the nitration methods of the prior art, in particular, U.S. Patent No. 3,180,889 to Hlavka et al. The nitration process of the Hlavka et al. patent involves the use of nitrogen tetroxide as the nitrating agent at reduced temperatures and is applicable only to 6-deoxytetracyclines since this reagent causes the formation of the 5a,6-anhydro derivatives when 6-hydroxytetracyclines are employed as starting materials. The novel nitration process of the present invention, on the other hand, is applicable to both 6-deoxytetracyclines and 6-hydroxytetracyclines. Another aspect of the improved process of the present invention is that it yields predominantly the 7-nitro isomer of the tetracycline starting materials (when R″ is hydrogen) which is the desired isomer from the standpoint of the anti-bacterial activity of the substituted 7- and/or 9-aminotetracyclines which may be prepared from the products of the improved process of the present invention. The prior art nitration methods, on the other hand, yield either an equal ratio of 7-nitro and 9-nitro isomers or tend to favor the production of the 9-nitro isomer.

The following examples are given by way of illustration and are not to be regarded as limitations of this invention, many variations of which are possible without departing from the spirit or scope thereof.

*Example 1.—Preparation of 6-demethyl-7-nitrotetracycline and 6-demethyl-9-nitrotetracycline*

A 1.0 gram portion (0.23 millimole) of 6-demethyltetracycline neutral was dissolved in 10 milliliters of trifluoroacetic acid at room temperature. To this was added dropwise a solution of 0.235 gram (0.23 millimole) of potassium nitrate in 2 milliliters of trifluoroacetic acid. The reaction mixture was stirred for 1 hour at room temperature and then added to 250 milliliters of ether. The solids were recovered by filtration, washed with ether and then dried at 50° C. overnight. A 0.5 gram portion of this solid was suspended in 10 milliliters of water, stirred for about 15 minutes and then filtered. The aqueous solution was extracted with one 3 milliliter portion and one 5 milliliter portion of butanol. These butanol extracts were evaporated to a solid residue which was triturated with ether and then dried under vacuum overnight. An 11.3 milligram portion of this material was chromatographed using the system heptane (5):ethyl acetate (8):methanol (2):water (2):on Versene® treated Celite®. The chromatographed product was evaporated to a solid residue, then dissolved in 2 milliliters of acetone and assayed.

$$\lambda_{max.}^{0.1NH_2SO_4}\ 258,\ 349\ m\mu$$

recovery was 1.72 milligrams (approximately 15% w./w.).

*Example 2.—Preparation of 5-hydroxy-7-nitrotetracycline and 5-hydroxy-9-nitrotetracycline*

A 0.262 gram portion of 5-hydroxytetracycline neutral was dissolved in 5 milliliters of trifluoroacetic acid at about 5° C. To this was added dropwise a solution of 0.057 gram of potassium nitrate in 2 milliliters of trifluoroacetic acid. The reaction mixture was stirred for 50 minutes at room temperature. A sample was taken and assayed:

$$\lambda_{max.}^{0.1NH_2SO_4}\ 260,\ 350\ m\mu$$

The reaction mixture was quenched in ether and 0.1 gram of crude nitrated product was thereby isolated. This crude nitrated product was purified by chromatography using the system heptane (5):ethyl acetate (8):methanol (2):water (2) on Versene® treated Celite®. The yield was 10 milligrams of a mixture of 5-hydroxy-7-nitrotetracycline and 5-hydroxy-9-nitrotetracycline, $$\lambda_{max.}^{0.1NH_2SO_4}\ 250,\ 352\ m\mu$$

*Example 3.—Nitration of 6-demethyl-6-deoxytetracycline*

A 417.88 milligram portion of 6-demethyl-6-deoxy-tetracycline neutral was dissolved in 10 milliliters of trifluoroacetic acid at room temperature by stirring over a 6 minute period. A 103.43 milligram portion of pulverized potassium nitrate was added and the mixture was stirred at room temperature. A sample was taken from this mixture and assayed as follows: Spectrophotomeric assay 408 γ/ml. as total nitro-6-demethyl-6-deoxytetracycline neutral (53.5% 9-nitro isomer, 46.5% 7-nitro isomer).

*Example 4.—Preparation of 6-demethyl-7-nitrotetracycline*

A 5.0 gram portion of 6-demethyltetracycline neutral was dissolved in 25 milliliters of trifluoroacetic acid at 4.0° C. To this solution was added dropwise a solution of 1.18 grams of potassium nitrate in 8 milliliters of trifluoroacetic acid. The reaction mixture was stirred at 4° C. for one hour and 40 minutes. This mixture was added to 150 milliliters of ice water and then filtered. The insolubles were triturated with 50 milliliters of water and then filtered. The two filtrates were combined and then lyophilized overnight to a solid residue. This residue was slurried in ether for one hour, collected by filtration and dried at 30° C. for one hour under vacuum. This material was chromatographed in 2 gram portions in the system heptane (5):ethylene acetate (8):methanol (2):water (2) on Versene® treated Celite®.

$$\lambda_{max.}^{0.1NH_2SO_4}\ 260,\ 351\ m\mu;\ \lambda_{max.}^{0.NNaOH}\ 280,\ 372\ m\mu$$

The yield was 14% as 6-demethyl-7-nitrotetracycline when determined by assaying the column eluate spectrophotometrically.

What is claimed is:

1. The process of preparing compounds of the formula:

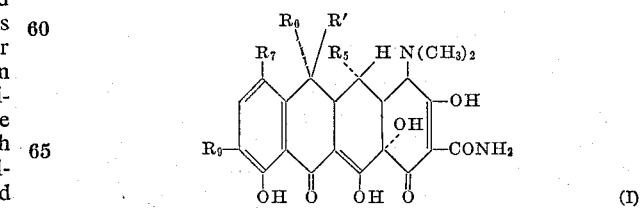

(I)

wherein $R_5$ is selected from the group consisting of hydrogen and hydroxy, R′ is selected from the group consisting of hydrogen and hydroxy, $R_6$ is selected from the group consisting of hydrogen and methyl, R′ and $R_6$ taken together is methylene, $R_7$ is selected from the group consisting of hydrogen, chloro and nitro and $R_9$ is selected from the group consisting of hydrogen and nitro with the proviso that $R_7$ and $R_9$ cannot both be hydrogen; which comprises contacting a compound of the formula:

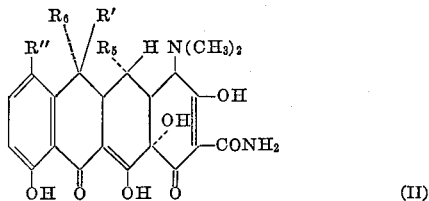

wherein $R_5$, $R'$ and $R_6$ are as hereinabove defined and $R''$ is selected from the group consisting of hydrogen and chloro; with potassium nitrate in trifluoroacetic acid.

2. A process according to claim 1 wherein $R_5$, $R'$, $R_6$, $R''$ and $R_9$ are hydrogen and $R_7$ is nitro.

3. A process according to claim 1 wherein $R_5$, $R'$, $R_6$, $R''$ and $R_7$ are hydrogen and $R_9$ is nitro.

4. A process according to claim 1 wherein $R_5$ and $R'$ are hydroxy, $R_6$ is methyl, $R''$ and $R_9$ are hydrogen and $R_7$ is nitro.

5. A process according to claim 1 wherein $R_5$ and $R'$ are hydroxy, $R_6$ is methyl, $R''$ and $R_7$ are hydrogen and $R_9$ is nitro.

6. A process according to claim 1 wherein $R_5$, $R_6$, $R''$ and $R_9$ are hydrogen, $R'$ is hydroxy and $R_7$ is nitro.

7. A process according to claim 1 wherein $R_5$, $R_6$, $R''$ and $R_7$ are hydrogen, $R'$ is hydroxy and $R_9$ is nitro.

8. A process according to claim 1 wherein $R_5$ is hydroxy, $R'$ and $R_6$ taken together is methylene, $R''$ and $R_9$ are hydrogen and $R_7$ is nitro.

9. A process according to claim 1 wherein $R_5$ and $R_6$ are hydrogen, $R'$ is hydroxy, $R''$ and $R_7$ are chloro and $R_9$ is nitro.

10. A process according to claim 1 wherein $R_5$, $R'$, $R_6$ and $R''$ are hydrogen and $R_7$ and $R_9$ are nitro.

References Cited
UNITED STATES PATENTS
3,180,889  4/1965  Hlavka _____ 260—559

NICHOLAS S. RIZZO, *Primary Examiner.*